United States Patent
Leonard

(10) Patent No.: US 9,982,659 B1
(45) Date of Patent: May 29, 2018

(54) METHODS FOR REFURBISHING WIND TURBINES

(71) Applicant: General Electric Company, Schenectady, NY (US)

(72) Inventor: Jay F. Leonard, Greenville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days. days.

(21) Appl. No.: 15/423,872

(22) Filed: Feb. 3, 2017

(51) Int. Cl.
| | |
|---|---|
| *F03D 80/50* | (2016.01) |
| *E04H 12/08* | (2006.01) |
| *E04H 12/34* | (2006.01) |
| *F03D 13/10* | (2016.01) |
| *F03D 13/20* | (2016.01) |

(52) U.S. Cl.
CPC ........... *F03D 80/50* (2016.05); *E04H 12/085* (2013.01); *E04H 12/342* (2013.01); *F03D 13/10* (2016.05); *F03D 13/20* (2016.05); *F05B 2230/60* (2013.01); *F05B 2230/70* (2013.01); *F05B 2230/80* (2013.01)

(58) Field of Classification Search
CPC ..... E04H 12/082; E04H 12/342; E04H 12/20; F03D 13/10; F03D 13/20; F03D 80/50
See application file for complete search history.

(56) References Cited

U.S. PATENT DOCUMENTS

| | | | |
|---|---|---|---|
| 8,277,184 B2 | 10/2012 | Nies et al. | |
| 8,826,614 B2 * | 9/2014 | Garcia Maestre | .... E04H 12/085 52/223.5 |
| 2007/0296220 A1 * | 12/2007 | Kristensen | .............. B66B 9/187 290/55 |
| 2008/0040983 A1 * | 2/2008 | Fernandez Gomez | . E04H 12/12 52/40 |
| 2011/0109106 A1 * | 5/2011 | Inda | ........................ B66C 1/108 294/215 |
| 2011/0140447 A1 * | 6/2011 | Paura | .................... E04H 12/085 290/55 |
| 2011/0223035 A1 * | 9/2011 | Paura | .................... E04H 12/085 416/244 R |
| 2012/0131876 A1 * | 5/2012 | Nies | ........................ B66C 1/108 52/651.01 |
| 2013/0180199 A1 * | 7/2013 | Vadlamudi | ............ E04H 12/085 52/651.01 |
| 2014/0230343 A1 * | 8/2014 | Lam | ....................... E04H 12/085 52/40 |
| 2015/0027068 A1 * | 1/2015 | Sayers | .................. E02D 27/425 52/173.1 |
| 2015/0226179 A1 * | 8/2015 | Neumann | ............... F03D 1/003 29/889.1 |

(Continued)

*Primary Examiner* — Paola Agudelo
(74) *Attorney, Agent, or Firm* — Dority & Manning, PA

(57) ABSTRACT

Methods for refurbishing a wind turbine are provided. A method includes removing an existing machine head and existing top tower section from the wind turbine. The wind turbine further includes a lower tower section, the lower tower section comprising a top flange, the top flange defining a first plurality of fastener holes disposed in a first hole pattern. The method further includes connecting a new machine head and new top tower section to the wind turbine. The new top tower section comprises a bottom flange, the bottom flange defining a second plurality of fastener holes disposed in a second hole pattern. The second hole pattern matches the first hole pattern.

18 Claims, 6 Drawing Sheets

(56) References Cited

U.S. PATENT DOCUMENTS

2015/0285225 A1* 10/2015 Oliaard ................ E04H 12/085
                                                      52/105
2016/0215762 A1* 7/2016 Rohden ................ E04H 12/085
2017/0022966 A1* 1/2017 Therkildsen ............ F03D 1/003
2017/0211547 A1* 7/2017 Thomas .................. F03D 13/10

* cited by examiner

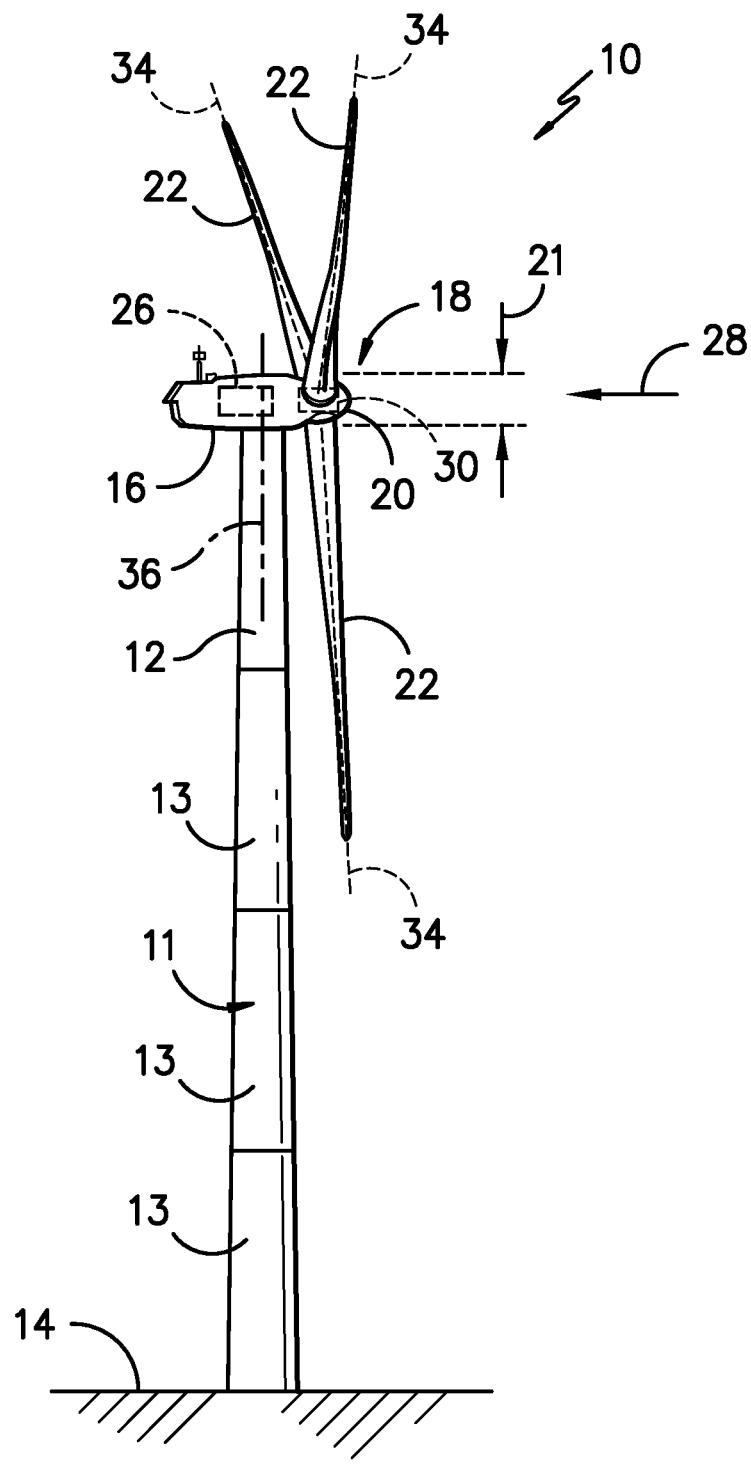
FIG. -1-

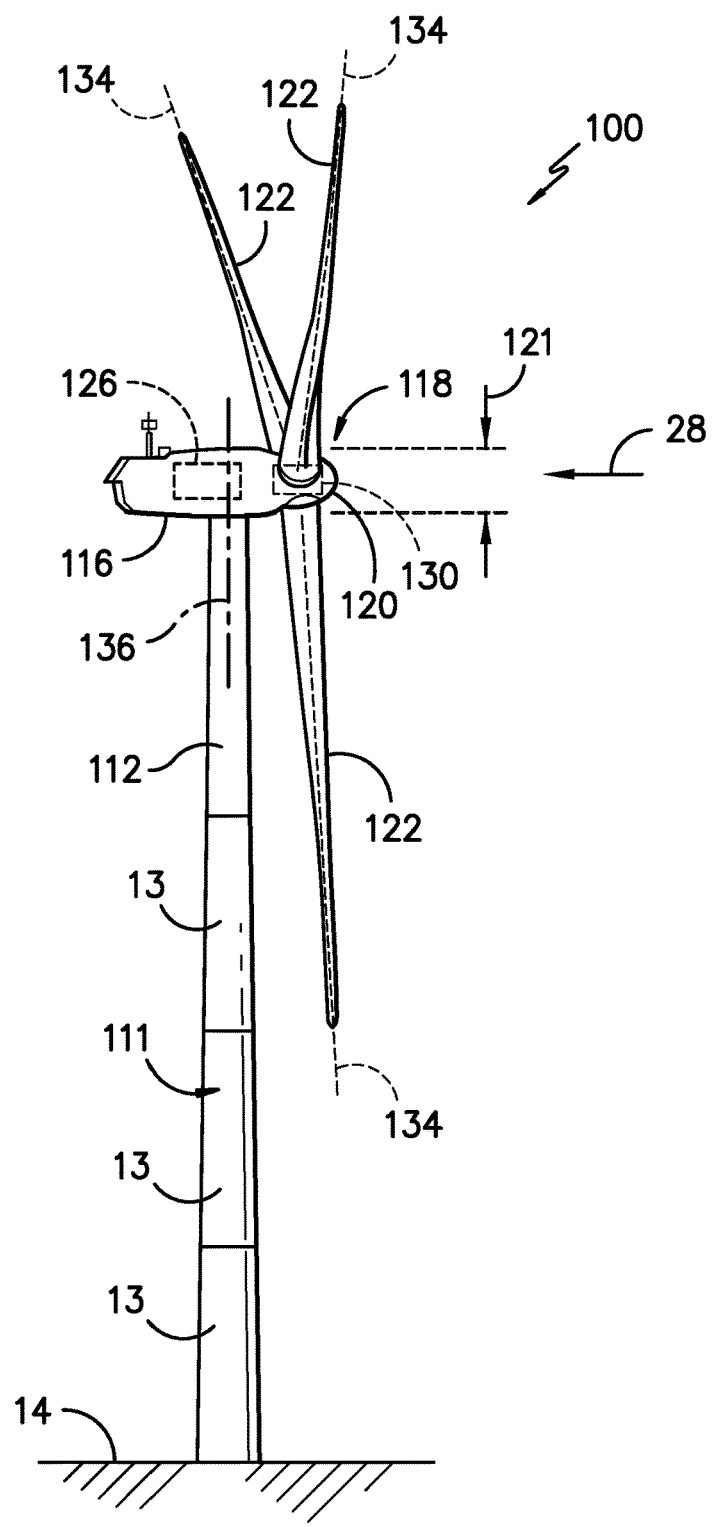
FIG. -2-

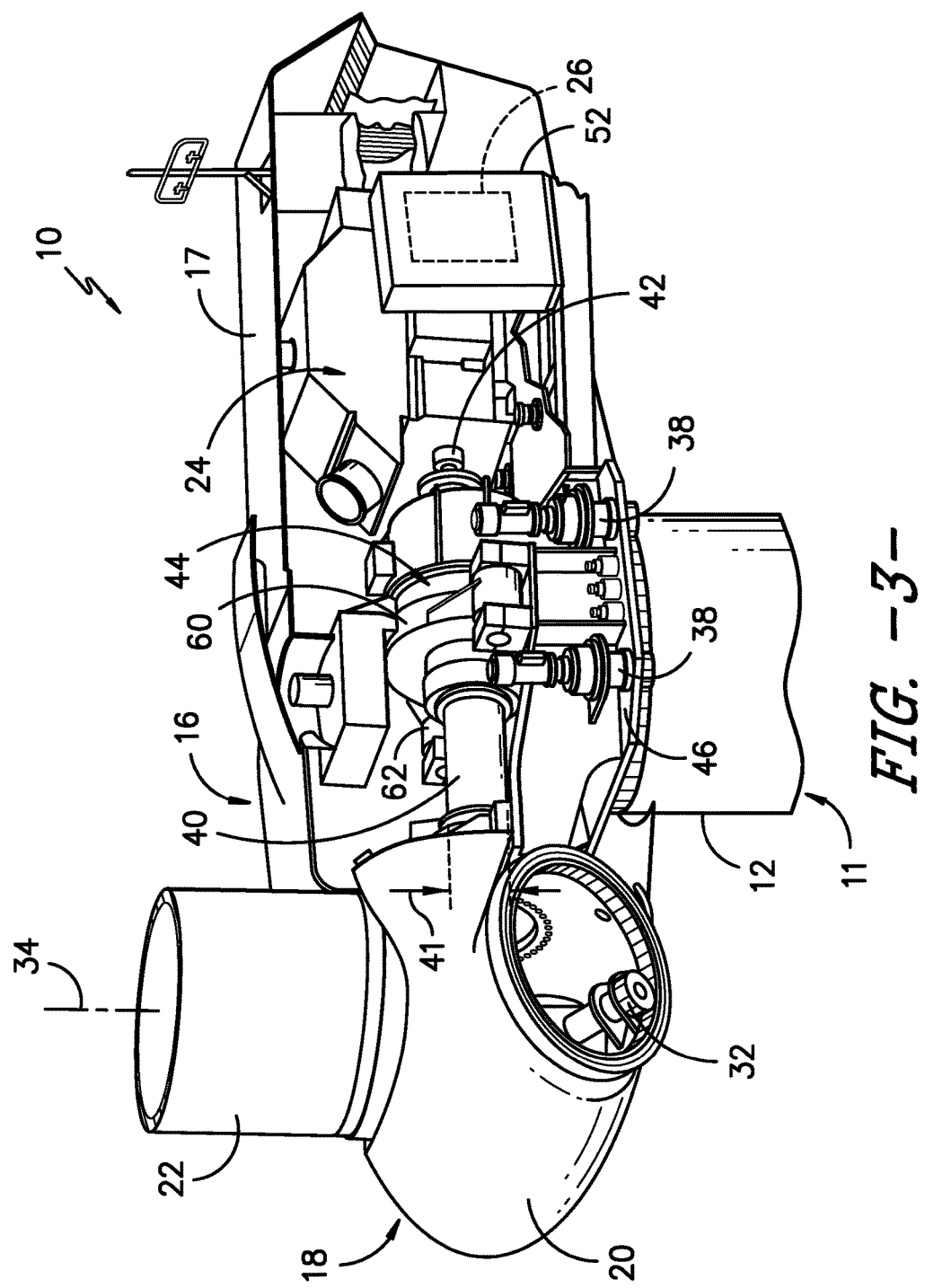
FIG. -3-

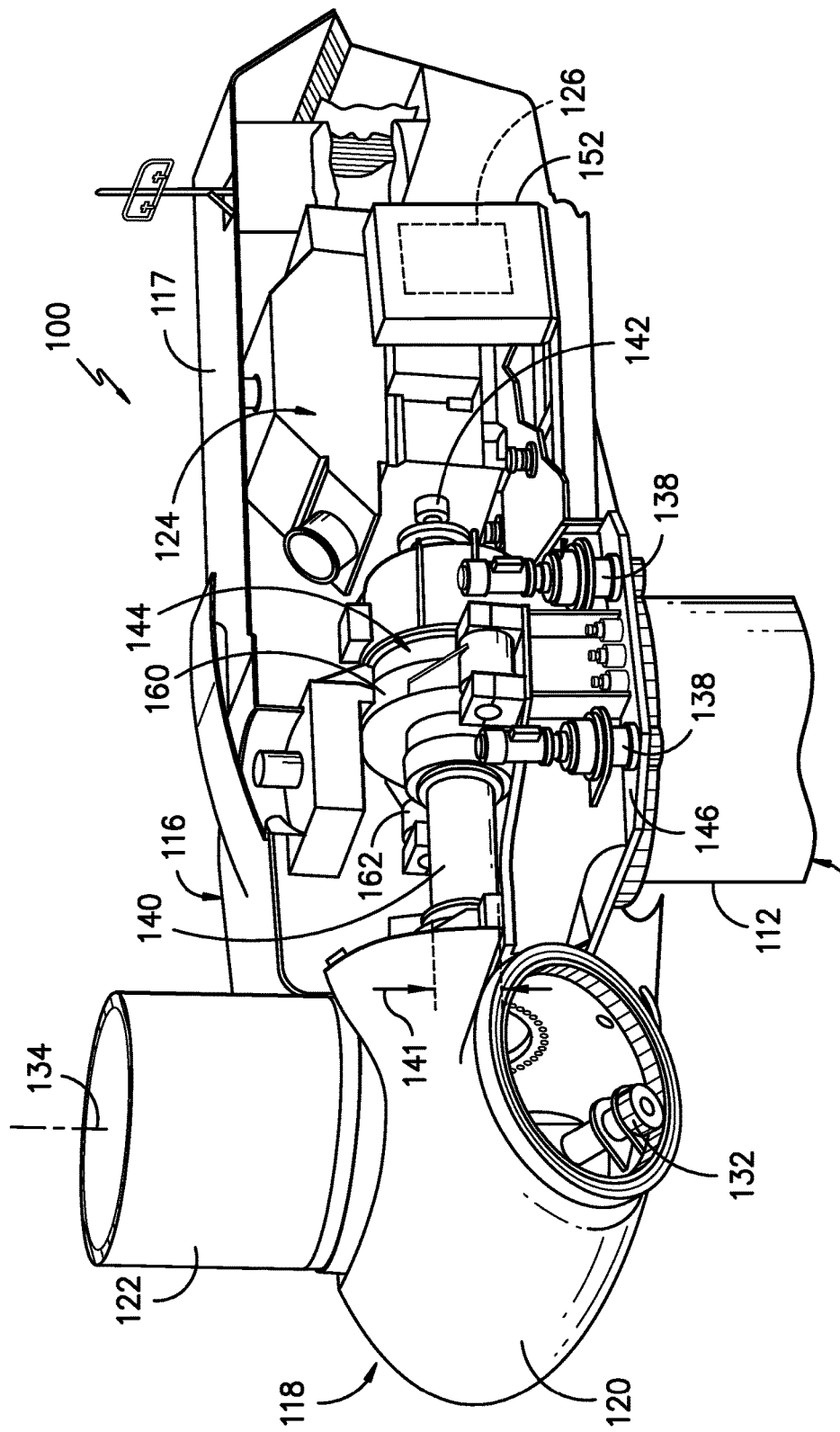
FIG. -4-

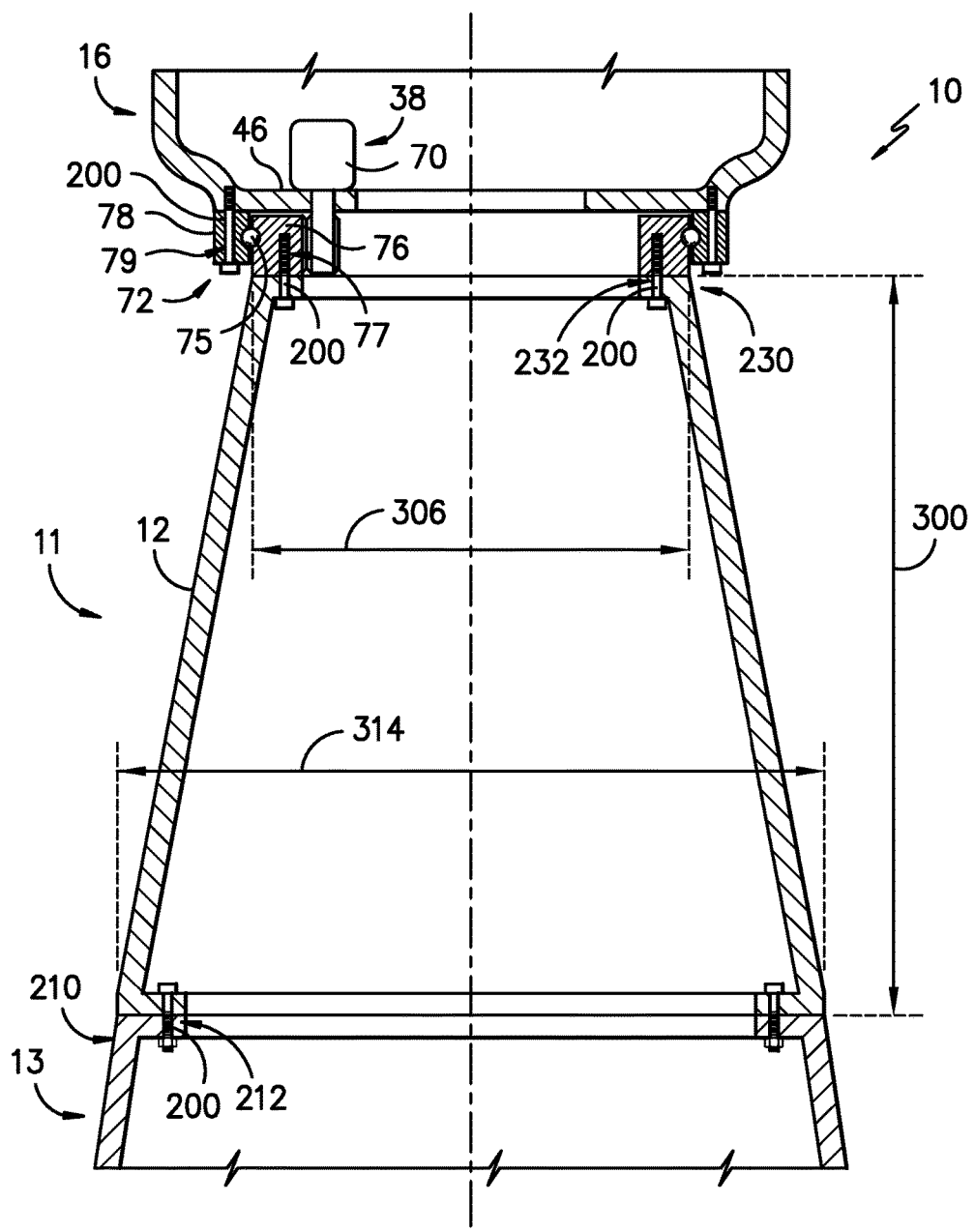
FIG. -5-

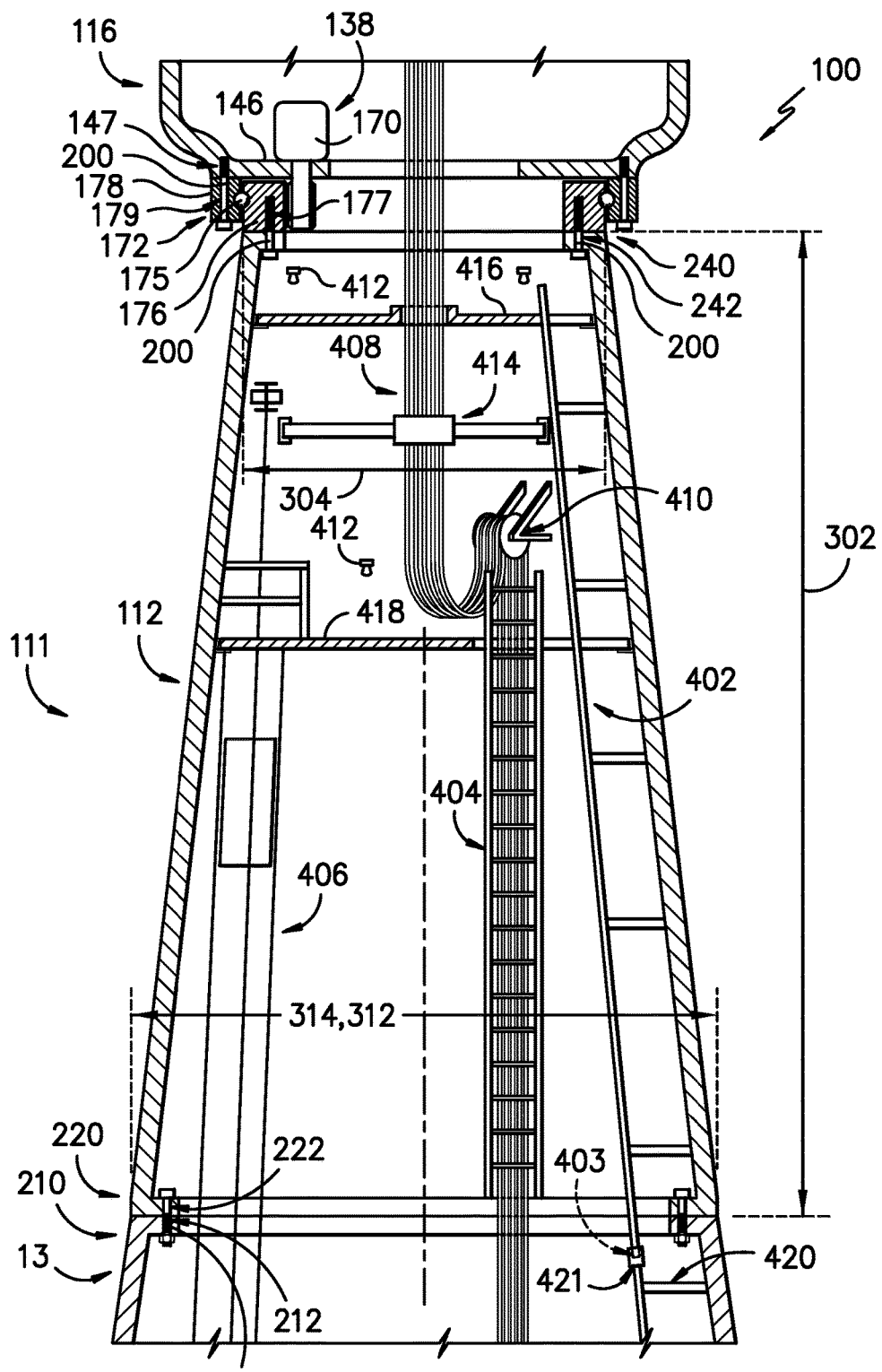
FIG. -6-

METHODS FOR REFURBISHING WIND TURBINES

FIELD OF THE INVENTION

The present disclosure relates generally to wind turbines, and more particularly to the methods for refurbishing wind turbines.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, machine head, and a rotor including one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

Wind turbine technology is rapidly progressing. Accordingly, as the technology utilized in existing wind turbines becomes outdated and/or existing wind turbines approach their designed lives, it may be desirable to refurbish such existing wind turbines and associated wind farms. Such refurbishment can provide various advantages, including the implementation of newer, more efficient technology and components on existing base components. For example, in many cases, the machine head and, optionally, the yaw drive, can be replaced. A new, more technologically advanced machine head and optional yaw drive can be provided on to an existing tower. Accordingly, additional life and more efficient power generation can be provided with reduced capital expenses.

One concern, however, is that substantial modifications to the top tower section of the tower may be needed to accommodate a new machine head. This tower section may house relatively complex internal components of the wind turbine, and these components may need to be refurbished and/or replaced to accommodate the new machine head.

Accordingly, improved methods for refurbishing wind turbines are desired. In particular, methods which reduce the cost and complexity associated with providing a new machine head would be advantageous.

BRIEF DESCRIPTION OF THE INVENTION

Aspects and advantages of the invention will be set forth in part in the following description, or may be obvious from the description, or may be learned through practice of the invention.

In accordance with one embodiment, a method for refurbishing a wind turbine is provided. The method includes removing an existing machine head and existing top tower section from the wind turbine. The wind turbine further includes a lower tower section, the lower tower section comprising a top flange, the top flange defining a first plurality of fastener holes disposed in a first hole pattern. The method further includes connecting a new machine head and new top tower section to the wind turbine. The new top tower section comprises a bottom flange, the bottom flange defining a second plurality of fastener holes disposed in a second hole pattern. The second hole pattern matches the first hole pattern.

In accordance with another embodiment, a method for refurbishing a wind turbine is provided. The method includes removing an existing machine head and existing top tower section from the wind turbine. The wind turbine further includes a lower tower section, the lower tower section comprising a top flange, the top flange defining a first plurality of fastener holes disposed in a first hole pattern. The method further includes connecting a new machine head and new top tower section to the wind turbine. The new machine head has at least one size characteristic that is different from a size characteristic of the existing machine head. The new top tower section comprises a bottom flange, the bottom flange defining a second plurality of fastener holes disposed in a second hole pattern. The second hole pattern matches the first hole pattern. The method further includes connecting at least one internal component of the new top tower section to an internal component of the lower tower section.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a perspective view of a wind turbine with an existing machine head and top tower section according to embodiments of the present disclosure;

FIG. 2 is a perspective view of a wind turbine with a new machine head and top tower section according to embodiments of the present disclosure;

FIG. 3 illustrates a perspective, internal view of an existing machine head of a wind turbine according to embodiments of the present disclosure;

FIG. 4 illustrates a perspective, internal view of a new machine head of a wind turbine according to embodiments of the present disclosure;

FIG. 5 is a cross-sectional view of an existing machine head and top tower section connected on a lower tower section according to embodiments of the present disclosure; and FIG. 6 is a cross-sectional view of a new machine head and top tower section connected on a lower tower section according to embodiments of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 illustrates a perspective view of one embodiment of an existing wind turbine 10. As shown, the wind turbine 10 includes a tower 11 extending from a support surface 14, a machine head 16 mounted on the tower 11, and a rotor 18 coupled to the machine head 16. The tower includes a plurality of tower sections which are stacked on top of each other along a vertical direction to form the tower 11. The plurality of tower sections may include a top tower section 12 and one or more lower tower sections 13. The top tower section 12 may be the uppermost tower section along the vertical direction. The top tower section 12 may be connected to a lower tower section 13 that is immediately below the top tower section 12. In some cases, additional lower tower sections 13 may additionally be provided under the lower tower section 13 to which the top tower section 12 is connected.

The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 3) positioned within the machine head 16 to permit electrical energy to be produced.

As shown, the wind turbine 10 may also include a turbine control system or a turbine controller 26 centralized within the machine head 16. However, it should be appreciated that the turbine controller 26 may be disposed at any location on or in the wind turbine 10, at any location on the support surface 14 or generally at any other location. The turbine controller 26 may generally be configured to control the various operating modes (e.g., start-up or shut-down sequences) and/or components of the wind turbine 10. For example, the controller 26 may be configured to control the blade pitch or pitch angle of each of the rotor blades 22 (i.e., an angle that determines a perspective of the rotor blades 22 with respect to the direction 28 of the wind) to control the loading on the rotor blades 22 by adjusting an angular position of at least one rotor blade 22 relative to the wind. For instance, the turbine controller 26 may control the pitch angle of the rotor blades 22, either individually or simultaneously, by transmitting suitable control signals/commands to a pitch controller of the wind turbine 10, which may be configured to control the operation of a plurality of pitch drives or pitch adjustment mechanisms 32 (FIG. 3) of the wind turbine, or by directly controlling the operation of the plurality of pitch drives or pitch adjustment mechanisms. Specifically, the rotor blades 22 may be rotatably mounted to the hub 20 by one or more pitch bearing(s) (not illustrated) such that the pitch angle may be adjusted by rotating the rotor blades 22 along their pitch axes 34 using the pitch adjustment mechanisms 32. Further, as the direction 28 of the wind changes, the turbine controller 26 may be configured to control a yaw direction of the machine head 16 about a yaw axis 36 to position the rotor blades 22 with respect to the direction 28 of the wind, thereby controlling the loads acting on the wind turbine 10. For example, the turbine controller 26 may be configured to transmit control signals/commands to a yaw drive mechanism 38 (FIG. 3) of the wind turbine 10, via a yaw controller or direct transmission, such that the machine head 16 may be rotated about the yaw axis 36.

It should be appreciated that the turbine controller 26 and/or the pitch controller 30 may generally comprise a computer or any other suitable processing unit. Thus, in several embodiments, the turbine controller 26 and/or pitch and yaw controllers may include one or more processor(s) and associated memory device(s) configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) of the turbine controller 26 and/or pitch and yaw controllers may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure the turbine controller 26 and/or pitch and yaw controllers to perform various computer-implemented functions. In addition, the turbine controller 26 and/or pitch and yaw controllers may also include various input/output channels for receiving inputs from sensors and/or other measurement devices and for sending control signals to various components of the wind turbine 10.

Referring now to FIG. 3, a simplified, internal view of one embodiment of the existing machine head 16 of the wind turbine 10 is illustrated. As shown, a generator 24 may be disposed within the machine head 16. In general, the generator 24 may be coupled to the rotor 18 of the wind turbine 10 for generating electrical power from the rotational energy generated by the rotor 18. For example, the rotor 18 may include a main shaft 40 coupled to the hub 20 for rotation therewith. The generator 24 may then be coupled to the main shaft 40 such that rotation of the main shaft 40 drives the generator 24. For instance, in the illustrated embodiment, the generator 24 includes a generator shaft 42 rotatably coupled to the main shaft 40 through a gearbox 44. However, in other embodiments, it should be appreciated that the generator shaft 42 may be rotatably coupled directly to the main shaft 40. Alternatively, the generator 24 may be directly rotatably coupled to the main shaft 40 (often referred to as a "direct-drive wind turbine").

It should be appreciated that the main shaft 40 may generally be supported within the machine head 16 by a base frame or bedplate 46 positioned atop the wind turbine tower 11. For example, the main shaft 40 may be supported by the base frame 46 via one or more pillow blocks mounted to the base frame 46.

Additionally, as indicated above, the turbine controller 26 may also be located within the machine head 16 of the wind turbine 10. For example, as shown in the illustrated embodiment, the turbine controller 26 is disposed within a control cabinet 52 mounted to a portion of the machine head 16. However, in other embodiments, the turbine controller 26 may be disposed at any other suitable location on and/or within the wind turbine 10 or at any suitable location remote to the wind turbine 10. Moreover, as described above, the turbine controller 26 may also be communicatively coupled to various components of the wind turbine 10 for generally controlling the wind turbine and/or such components. For example, the turbine controller 26 may be communicatively coupled to the yaw drive mechanism(s) 38 of the wind turbine 10 for controlling and/or altering the yaw direction of the machine head 16 relative to the direction 28 (FIG. 1) of the wind. Similarly, the turbine controller 26 may also be communicatively coupled to each pitch adjustment mechanism 32 of the wind turbine 10 (one of which is shown) through the pitch controller 30 for controlling and/or altering the pitch angle of the rotor blades 22 relative to the direction 28 of the wind. For instance, the turbine controller 26 may be configured to transmit a control signal/command to each pitch adjustment mechanism 32 such that one or more actuators (not shown) of the pitch adjustment mechanism 32 may be utilized to rotate the blades 22 relative to the hub 20.

Referring still to FIG. 3, gearbox 44 may be coupled to main shaft 40, and may be mounted to the base frame 46. As shown, gearbox 44 may include an outer casing 60 which may surround and generally enclose the internal gearbox components, such as the various gears, etc. thereof. Further, one or more torque arms 62 may extend from the outer casing 60. Typically, two torque arms 62 extend from the outer casing 60 on generally opposing sides of the casing 60. A torque arm 62 may generally facilitate reaction and transmission of loads to which the shaft 40, etc., are subjected by transmitting these loads from the gearbox 44 to, for example, the base frame 46.

As illustrated, a nacelle 17 may surround and enclose the various components within the machine head 16. In general, the base frame 46 and nacelle 17 may form the outer surface(s) of the machine head 16.

As discussed herein, the present disclosure is directed to methods for refurbishing wind turbines 10. Such methods may include, as discussed herein, removing the existing machine head 16 and the existing top tower section 12. Such methods may further include, as discussed herein, providing and connecting a new machine head 116 and a new top tower section 112. Such removal, provision, and connection may occur via the use of conventional apparatus such as cranes and conventional tools for fastening and unfastening the various connections, as is generally understood. The machine head 116 includes new components relative to the components of the existing machine head 16, and in exemplary embodiments one or more of these components is a technologically advanced component (relative to the corresponding component of the existing machine head 16) that facilitates the implementation of newer, more efficient technology. Further, as discussed herein the new machine head 116 may in some embodiments have at least one size characteristic that is different from the corresponding size characteristic of the existing machine head 116.

FIG. 2 illustrates a perspective view of one embodiment of a new, i.e. refurbished, wind turbine 100. As shown, the wind turbine 100 includes a tower 111 extending from the support surface 14, a machine head 116 mounted on the tower 111, and a rotor 118 coupled to the machine head 116. The tower includes a plurality of tower sections which are stacked on top of each other along a vertical direction to form the tower 111. The plurality of tower sections may include a new top tower section 112 which is provided on the one or more existing lower tower sections 13. The top tower section 112 may be the uppermost tower section along the vertical direction. The top tower section 112 may be connected to the lower tower section 13 that is immediately below the top tower section 112, and may thus replace the existing top tower section 12.

The rotor 118 includes a rotatable hub 120 and at least one rotor blade 122 coupled to and extending outwardly from the hub 120. For example, in the illustrated embodiment, the rotor 118 includes three rotor blades 122. However, in an alternative embodiment, the rotor 118 may include more or less than three rotor blades 122. Each rotor blade 122 may be spaced about the hub 120 to facilitate rotating the rotor 118 to enable kinetic energy to be transferred from the wind into usable mechanical energy, and subsequently, electrical energy. For instance, the hub 120 may be rotatably coupled to an electric generator 124 (FIG. 4) positioned within the machine head 116 to permit electrical energy to be produced.

As shown, the wind turbine 100 may also include a turbine control system or a turbine controller 126 centralized within the machine head 116. However, it should be appreciated that the turbine controller 126 may be disposed at any location on or in the wind turbine 100, at any location on the support surface 14 or generally at any other location. The turbine controller 126 may generally be configured to control the various operating modes (e.g., start-up or shut-down sequences) and/or components of the wind turbine 100. For example, the controller 126 may be configured to control the blade pitch or pitch angle of each of the rotor blades 122 (i.e., an angle that determines a perspective of the rotor blades 122 with respect to the direction 28 of the wind) to control the loading on the rotor blades 122 by adjusting an angular position of at least one rotor blade 122 relative to the wind. For instance, the turbine controller 126 may control the pitch angle of the rotor blades 122, either individually or simultaneously, by transmitting suitable control signals/commands to a pitch controller of the wind turbine 100, which may be configured to control the operation of a plurality of pitch drives or pitch adjustment mechanisms 132 (FIG. 4) of the wind turbine, or by directly controlling the operation of the plurality of pitch drives or pitch adjustment mechanisms. Specifically, the rotor blades 122 may be rotatably mounted to the hub 120 by one or more pitch bearing(s) (not illustrated) such that the pitch angle may be adjusted by rotating the rotor blades 122 along their pitch axes 134 using the pitch adjustment mechanisms 132. Further, as the direction 28 of the wind changes, the turbine controller 126 may be configured to control a yaw direction of the machine head 116 about a yaw axis 136 to position the rotor blades 122 with respect to the direction 128 of the wind, thereby controlling the loads acting on the wind turbine 100. For example, the turbine controller 126 may be configured to transmit control signals/commands to a yaw drive mechanism 138 (FIG. 4) of the wind turbine 100, via a yaw controller or direct transmission, such that the machine head 116 may be rotated about the yaw axis 136.

It should be appreciated that the turbine controller 126 and/or the pitch controller 130 may generally comprise a computer or any other suitable processing unit. Thus, in several embodiments, the turbine controller 126 and/or pitch and yaw controllers may include one or more processor(s) and associated memory device(s) configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) of the turbine controller 126 and/or pitch and yaw controllers may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure the turbine controller 126 and/or pitch and yaw controllers to perform various computer-implemented functions. In addition, the turbine controller 126 and/or pitch and yaw controllers may also include various input/output channels for receiving inputs from sensors and/or other measurement devices and for sending control signals to various components of the wind turbine 100.

Referring now to FIG. 4, a simplified, internal view of one embodiment of the new machine head 16 of the wind turbine 100 is illustrated. As shown, a generator 124 may be disposed within the machine head 116. In general, the generator 124 may be coupled to the rotor 118 of the wind turbine 100 for generating electrical power from the rotational energy generated by the rotor 118. For example, the rotor 118 may include a main shaft 140 coupled to the hub 120 for rotation therewith. The generator 124 may then be coupled to the main shaft 140 such that rotation of the main shaft 140 drives the generator 124. For instance, in the illustrated embodiment, the generator 124 includes a generator shaft 142 rotatably coupled to the main shaft 140 through a gearbox 144. However, in other embodiments, it should be appreciated that the generator shaft 142 may be rotatably coupled directly to the main shaft 140. Alternatively, the generator 124 may be directly rotatably coupled to the main shaft 140 (often referred to as a "direct-drive wind turbine").

It should be appreciated that the main shaft 140 may generally be supported within the machine head 116 by a base frame or bedplate 146 positioned atop the wind turbine tower 111. For example, the main shaft 140 may be supported by the base frame 146 via one or more pillow blocks mounted to the base frame 146.

Additionally, as indicated above, the turbine controller 126 may also be located within the machine head 116 of the wind turbine 100. For example, as shown in the illustrated embodiment, the turbine controller 126 is disposed within a control cabinet 152 mounted to a portion of the machine head 116. However, in other embodiments, the turbine controller 126 may be disposed at any other suitable location on and/or within the wind turbine 100 or at any suitable location remote to the wind turbine 100. Moreover, as described above, the turbine controller 126 may also be communicatively coupled to various components of the wind turbine 10 for generally controlling the wind turbine and/or such components. For example, the turbine controller 126 may be communicatively coupled to the yaw drive mechanism(s) 138 of the wind turbine 100 for controlling and/or altering the yaw direction of the machine head 116 relative to the direction 28 (FIG. 2) of the wind. Similarly, the turbine controller 126 may also be communicatively coupled to each pitch adjustment mechanism 132 of the wind turbine 100 (one of which is shown) through the pitch controller 130 for controlling and/or altering the pitch angle of the rotor blades 122 relative to the direction 28 of the wind. For instance, the turbine controller 126 may be configured to transmit a control signal/command to each pitch adjustment mechanism 132 such that one or more actuators (not shown) of the pitch adjustment mechanism 132 may be utilized to rotate the blades 122 relative to the hub 20.

Referring still to FIG. 4, gearbox 144 may be coupled to main shaft 140, and may be mounted to the base frame 146. As shown, gearbox 144 may include an outer casing 160 which may surround and generally enclose the internal gearbox components, such as the various gears, etc. thereof. Further, one or more torque arms 162 may extend from the outer casing 160. Typically, two torque arms 162 extend from the outer casing 160 on generally opposing sides of the casing 160. A torque arm 162 may generally facilitate reaction and transmission of loads to which the shaft 140, etc., are subjected by transmitting these loads from the gearbox 144 to, for example, the base frame 146.

As illustrated, a nacelle 117 may surround and enclose the various components within the machine head 116. In general, the base frame 146 and nacelle 117 may form the outer surface(s) of the machine head 116.

It should be understood that not all of the internal and external components of the new machine head 116 need to be different from the internal and external components of the existing machine head 16. For example, in some cases, one or more existing components could be transferred from the existing machine head 16 to the new machine head 116. In general, at least the nacelle 117 and base frame 146 may be new components that are provided as part of the new machine head 116.

As discussed, the new machine head 116 may have at least one size characteristic that is different from a size characteristic of the existing machine head 16. A size characteristic is a size, such as a weight, length, diameter, etc. of the machine head or a component thereof. For example, in some embodiments, a weight of the new machine head 116 may be different from, i.e. greater than or less than, a weight of the existing machine head 16. Such weights may be calculated, for example, based only on the weights of the respective nacelles and base frames, or based on the machine heads with all internal and external components included therein. In some embodiments, a maximum diameter 41 of the main shaft 40 (also referred to as the rotor shaft) may be different from, i.e. greater than or less than, a maximum diameter 141 of the main shaft 140 (also referred to as the rotor shaft). In some embodiments, a maximum diameter 21 of the hub 20 (also referred to as the rotor hub) may be different from, i.e. greater than or less than, a maximum diameter 121 of the hub 120 (also referred to as the rotor hub). In some embodiments, a maximum length, width and/or height of the new machine head 116 may be different from, i.e. greater than or less than, a maximum length, width and/or height of the existing machine head 16.

Referring now to FIGS. 5 and 6, cross-sectional views of components of the existing wind turbine 10 and new wind turbine 110 are provided. As discussed, existing wind turbine 10 may include a lower tower section 13, a top tower section 12, and a machine head 16. The new wind turbine 100 may include the lower tower section 13, a new top tower section 112, and a new machine head 116. After removal of the existing machine head 16 and existing top tower section 12, the new top tower section 112 and new machine head 116 may be connected to the wind turbine to form the new wind turbine 100.

The lower tower section 13 may include a top flange 210 and a first plurality of fastener holes 212 may be defined in the top flange 210. The top flange 210 may connect the lower tower section 13 to the existing and new top tower sections 12, 112. Fasteners 200, such as bolts or other suitable mechanical fastening devices, may be extended through the first fastener holes 212 and fastener holes in the existing top tower section 12 or new top tower section 112 to connect these components together.

For example, as illustrated in FIG. 6, the new top tower section 112 may include a bottom flange 220 and a second plurality of fastener holes 222 may be defined in the bottom flange 220. The first plurality of fastener holes 212 may be provided in a first hole pattern, and the second plurality of fastener holes 222 may be provided in a second hole pattern. A hole pattern is generally defined as a generally annular array of a plurality of fastener holes, and is defined by a maximum outer diameter (i.e. a distance between centers of the furthest apart pair of holes) and the number of holes and spacing therebetween. In exemplary embodiments, the second hole pattern may match the first hole pattern, such that mating fastener holes of the first and second pluralities of fastener holes 212, 222 align and allow fasteners 200 to be extended therethrough to connect the lower tower section 13 and new top tower section 112.

As illustrated in FIG. 5, the existing top tower section 12 may also include a bottom flange and a plurality of fastener holes may be defined in this bottom flange. Because the bottom flange 220 of the new top tower section 112 is connected to the top flange 210 of the lower tower section 13, the second hole pattern of the second plurality of fastener holes 222 may match the hole pattern of the plurality of fastener holes defined in the bottom flange of the existing top tower section 12.

Referring still to FIG. 5, the existing top tower section 12 may include a top flange 230 and a third plurality of fastener holes 232 may be defined in the top flange 230. The third plurality of fastener holes 232 may be provided in a third hole pattern. Referring now to FIG. 6, the new top tower section 112 may include a top flange 240 and a fourth plurality of fastener holes 242 may be defined in the top flange 240. The fourth plurality of fastener holes 242 may be provided in a fourth hole pattern. In exemplary embodiments, the fourth hole pattern may be different from the third hole pattern, thus facilitating the connection of a new yaw bearing having fastener holes in a new hole pattern different from that of a removed existing yaw bearing as discussed herein. Alternatively, the fourth hole pattern may match the third hole pattern, and the existing yaw bearing or a new yaw bearing may be utilized.

As discussed, the new top tower section 112 and new machine head 116 may be connected to the wind turbine to form the new wind turbine 100. The new top tower section 112 may be connected to the lower tower section 13 via mating fastener holes and fasteners as discussed herein. The new machine head 116 may be connected through a drive mechanism to the new wind turbine 100.

As shown in FIG. 5 and as discussed, the existing wind turbine 100 may include an existing yaw drive mechanism 38. The yaw drive mechanism 38 may include yaw drive 70 and a yaw bearing 72. The yaw bearing 72 may include an inner race 76 and an outer race 78, and may further include one or more bearings 75 disposed between the inner race 76 and outer race 78. A plurality of fastener holes 77 may be defined in the inner race 76, and a plurality of fastener holes 79 may be defined in the outer race 78.

The new wind turbine 100 may include a new yaw drive mechanism 138 or the existing yaw drive mechanism 38. For example, in some embodiments as shown in FIG. 6 and as discussed, the new wind turbine 100 may include an existing yaw drive mechanism 138. The yaw drive mechanism 138 may include yaw drive 170 and a yaw bearing 172. The yaw bearing 172 may include an inner race 176 and an outer race 178, and may further include one or more bearings 175 disposed between the inner race 176 and outer race 178. A plurality of fastener holes 177 may be defined in the inner race 176, and a plurality of fastener holes 179 may be defined in the outer race 178. The plurality of fastener holes 177 defined in the inner race 176 may be a fifth plurality of fastener holes provided in a fifth hole pattern. The fifth hole pattern may match the fourth hole pattern, such that mating fastener holes of the fourth and fifth pluralities of fastener holes 242, 177 align and allow fasteners 200 to be extended therethrough to connect the yaw bearing 172 and new top tower section 112.

Alternatively, the plurality of fastener holes 77 defined in the inner race 76 may be the fifth plurality of fastener holes provided in a fifth hole pattern. The fifth hole pattern may match the fourth hole pattern, such that mating fastener holes of the fourth and fifth pluralities of fastener holes 242, 77 align and allow fasteners 200 to be extended therethrough to connect the yaw bearing 72 and new top tower section 112.

The new machine head 116 may be connected to the yaw drive mechanism 38, 138, such as to the outer race 78, 178 of the yaw bearing 72, 172. In particular, the base frame 146 may be connected to the outer race 78, 178. For example, the plurality of fastener holes 79, 179 may be a sixth plurality of fastener holes provided in a sixth hole pattern. A seventh plurality of fastener holes 147 may be defined in the new base frame 146, and this plurality of fastener holes 147 may be provided in a seventh hole pattern. The seventh hole pattern may match the sixth hole pattern, such that mating fastener holes of the sixth and seventh pluralities of fastener holes 79 or 179 and 147 align and allow fasteners 200 to be extended therethrough to connect the yaw bearing 72 and new machine head 116.

In some embodiments, the new top tower section 112 may have one or more size characteristics that are different from, i.e. greater or less than, corresponding size characteristics of the existing top tower section 12. For example, in some embodiments, a maximum length 300 (along the vertical direction) of the existing top tower section 12 may be different from, i.e. greater or less than, a maximum length 302 (along the vertical direction) of the new top tower section 302. Alternatively, however, such lengths 300, 302 may be identical. In some embodiments, an outer diameter 304 of the new top tower section 112 at the top flange 240 may be different from, i.e. greater or less than, an outer diameter 306 of the existing top tower section 12 at the top flange 230. Alternatively, however, such diameters 304, 306 may be identical. It should be noted that, in exemplary embodiments, an outer diameter 312 of the new top tower section 112 at the bottom flange 220 may correspond to (i.e. be the same size as) an outer diameter 314 of the lower tower section 13 at the top flange 210. Further, in exemplary embodiments, an inner diameter of the new top tower section 112 at the bottom flange 220 may correspond to (i.e. be the same size as) an inner diameter of the lower tower section 13 at the top flange 210.

Referring now to FIG. 6, the new top tower section 112 may in exemplary embodiments include one or more internal components, i.e. components disposed in the interior of the new top tower section 112. One or more of these internal components may be pre-fabricated into the new top tower section 112 before the section 112 is connected to the lower tower section 13, which may advantageously reducing refurbishment and assembly costs. Further, one or more of these internal components may interface with components of the new machine head 116 and/or lower tower section 13.

Accordingly, in some embodiments, a method in accordance with the present disclosure may further include connecting one or more internal components of the new top tower section 112 to corresponding internal components of the lower tower section 13.

For example, new top tower section 112 may include any one or more of an upper personnel ladder section 402, a cable ladder 404, a lift assembly 406, a drip loop cable bundle 408, a cable saddle bracket 410, one or more tie-offs 412, a cable structural support bracket 414, an assembly deck 416, and/or a saddle deck 418.

The lower tower section 13 may include a lower personnel ladder section 420 which may be connectable to the upper personnel ladder section 402. For example, the upper personnel ladder section 402 may include a mating feature 403, such as a male or female fitting. The lower personnel ladder section 420 may include a mating feature 421, such as a female or male fitting. These fittings may mate with each other to connect the upper and lower personnel ladder sections 402, 420 together.

Other internal components may also extend from the new top tower section 112 into other sections of the wind turbine 100 such as the lower tower section 13 or new machine head 116. For example, the lift assembly 406 (i.e. the support cables thereof) may extend into the lower tower section 13 to provide lift capabilities between tower sections.

The drip loop cable bundle 408 may include a plurality of cables which extend through the new top tower section 112 to the lower tower section 13 and the machine head 116. For example, the cables of the bundle may be connectable to the new machine head 116, i.e. to various internal components thereof, to supply power and/or communications to the new machine head 116. The cables may further be connectable to suitable power and or communications sources.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for refurbishing a wind turbine, the method comprising:
   removing an existing machine head and an existing top tower section from the wind turbine, the wind turbine further comprising a lower tower section, the lower tower section comprising a top flange, the top flange of the lower tower section defining a first plurality of fastener holes disposed in a first hole pattern; and
   connecting a new machine head and a new top tower section to the wind turbine, wherein the new top tower section comprises a bottom flange, the bottom flange defining a second plurality of fastener holes disposed in a second hole pattern, and wherein the second hole pattern matches the first hole pattern, existing top tower section further comprising a top flange that defines a third plurality of fastener holes disposed in a third hole pattern, the new top tower section comprising a top flange that defines a fourth plurality of fastener holes disposed in a fourth hole pattern, wherein the fourth hole pattern is different from the third hole pattern.

2. The method of claim 1, wherein the new top tower section has a maximum length that is different from a maximum length of the existing top tower section.

3. The method of claim 1, wherein an outer diameter of the new top tower section at the bottom flange corresponds to an outer diameter of the lower tower section at the top flange.

4. The method of claim 1, wherein an outer diameter of the new top tower section at a top flange of the new top tower section is different from an outer diameter of the existing top tower section at a top flange of the existing top tower section.

5. The method of claim 1, wherein a weight of the new machine head is different from a weight of the existing machine head.

6. The method of claim 1, wherein a maximum diameter of a rotor shaft of the new machine head is greater than a maximum diameter of a rotor shaft of the existing machine head.

7. The method of claim 1, wherein a maximum diameter of a rotor hub of the new machine head is greater than a maximum diameter of a rotor hub of the existing machine head.

8. The method of claim 1, wherein a new yaw bearing is connected between the new machine head and the new top tower section, the new yaw bearing comprising an inner race and an outer race, wherein a fifth plurality of fastener holes is defined in the inner race in a fifth hole pattern, and wherein the fifth hole pattern matches the fourth hole pattern.

9. The method of claim 1, wherein the new top tower section comprises an upper personnel ladder section and an upper cable ladder section.

10. The method of claim 9, wherein the lower tower section comprises a. lower personnel ladder section, and wherein the upper personnel ladder section is connectable to the lower personnel ladder section.

11. The method of claim 1, wherein the new top tower section comprises an assembly deck and a saddle deck.

12. The method of claim 1, wherein the new top tower section comprises a drip loop cable bundle, the drip loop cable bundle connectable to the new machine head.

13. A method for refurbishing a wind turbine, the method comprising:
   removing an existing machine head and an existing top tower section from the wind turbine, the wind turbine further comprising a lower tower section, the lower tower section comprising a top flange, the top flange of the lower tower section defining a first plurality of fastener holes disposed in a first hole pattern;
   connecting a new machine head and a new top tower section to the wind turbine, the new machine head having at least one size characteristic that is different from a size characteristic of the existing machine head, wherein the new top tower section comprises a bottom flange, the bottom flange defining a second plurality of fastener holes disposed in a second hole pattern, the second hole pattern matching the first hole pattern, the existing top tower section further comprising a top flange that defines a third plurality of fastener holes disposed in a third hole pattern, the new top tower section comprising a top flange that defines a fourth plurality of fastener holes disposed in a fourth hole pattern, wherein the fourth hole pattern is different from the third hole pattern; and connecting at least one internal component of the new top tower section to an internal component of the lower tower section.

14. The method of claim 13, wherein the at least one size characteristic of the new machine head is greater than the size characteristic of the existing machine head.

15. The method of claim 13, wherein a new yaw bearing is connected between the new machine head and the new top tower section, the new yaw bearing comprising an inner race and an outer race, wherein a fifth plurality of fastener holes is defined in the inner race in a fifth hole pattern, and wherein the fifth hole pattern matches the fourth hole pattern.

16. The method of claim 13, wherein the new top tower section has a maximum length that is different from a maximum length of the existing top tower section.

17. The method of claim 13, wherein an outer diameter of the new top tower section at the bottom flange corresponds to an outer diameter of the lower tower section at the top flange.

18. The method of claim 13, wherein an outer diameter of the new top tower section at a top flange of the new top tower section is different from an outer diameter of the existing top tower section at a top flange of the existing top tower section.

* * * * *